Dec. 14, 1926.
J. T. RITENOUR
1,611,075
TRACTOR HITCH
Filed Nov. 27, 1925
3 Sheets-Sheet 2
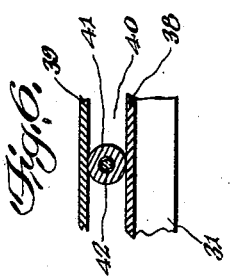
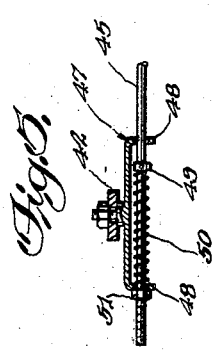
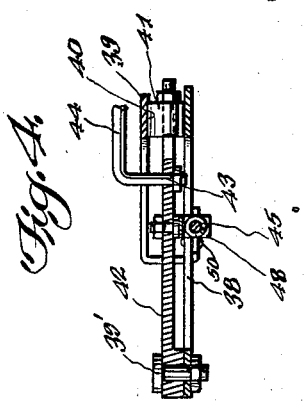
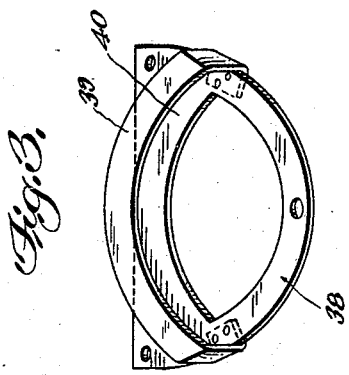
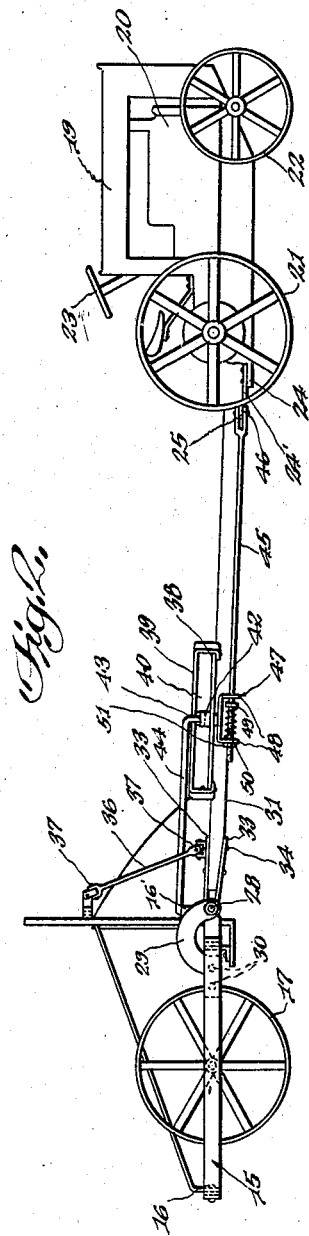
John T. Ritenour
INVENTOR
BY Victor J. Evans
ATTORNEY Dec. 14, 1926.
J. T. RITENOUR
1,611,075
TRACTOR HITCH
Filed Nov. 27, 1925   3 Sheets-Sheet 3
Fig. 10.
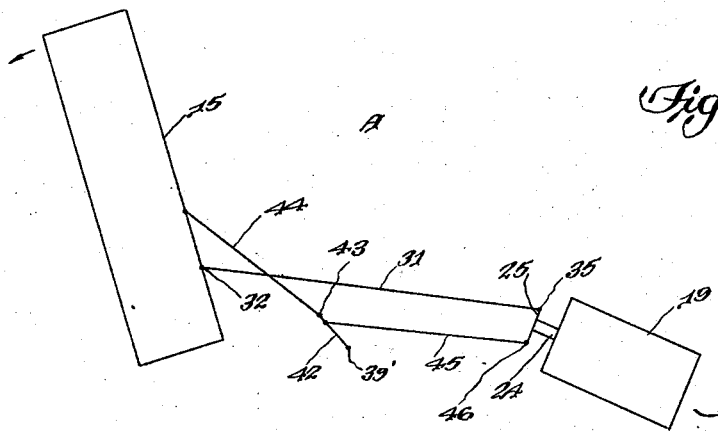
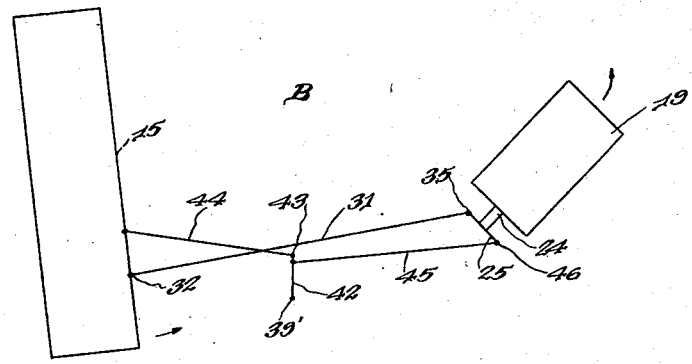
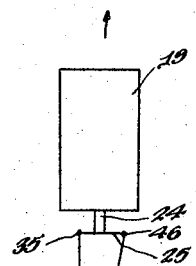
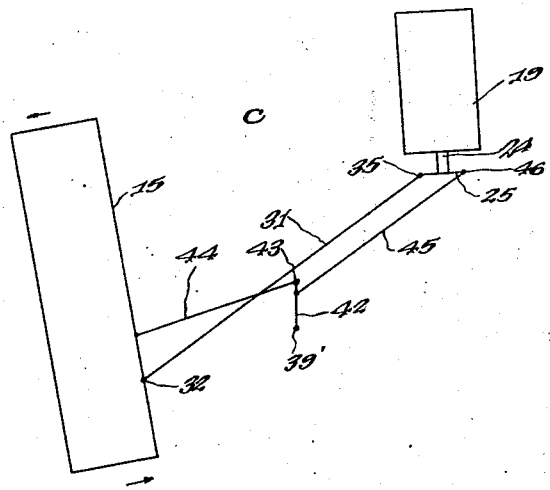
John T. Ritenour
INVENTOR
BY Victor J. Evans
ATTORNEY
WITNESS:

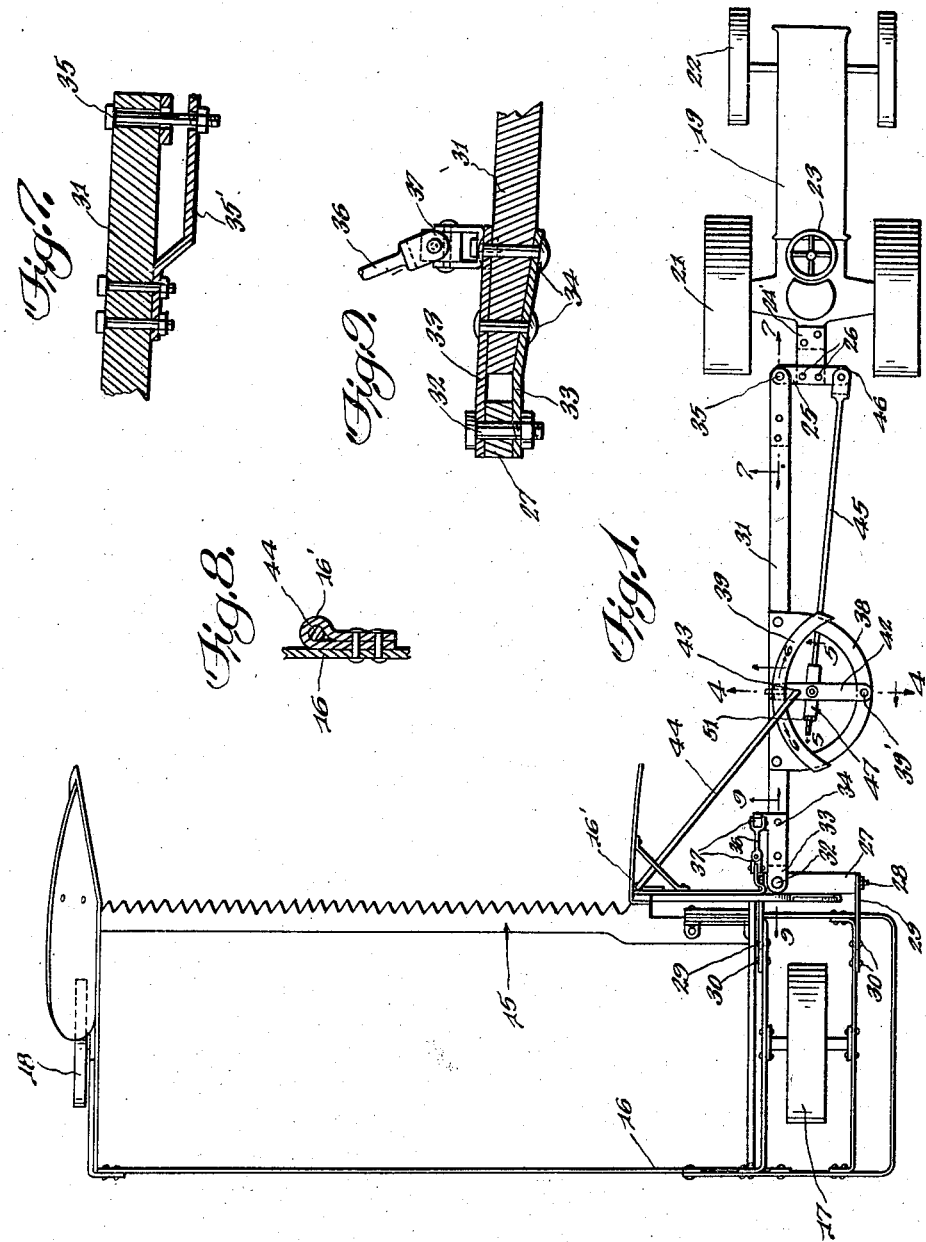

Patented Dec. 14, 1926.

1,611,075

UNITED STATES PATENT OFFICE.

JOHN T. RITENOUR, OF OXFORD, INDIANA.

TRACTOR HITCH.

Application filed November 27, 1925. Serial No. 71,771.

This invention relates to certain novel improvements in tractor hitches and has for its principal object the provision of a device of this character which will be highly efficient in use and economical in manufacture.

The hitch embodying the invention is designed to provide operative connection between the tractor and a farming implement such as for example a binder or cultivator. In the ordinary hitch between a tractor and a farming implement difficulty resides in the fact that the operator of the tractor is unable, by means of the hitch construction to maneuver the tractor to guide the implement to make a straight angle turn at the completion of the first swath. Tractors which I am familiar with prior to my invention include hitches which guide a farming implement, during traction, in curved fashion at the corners of the grain line of a field. The farming implement being tractioned in this manner does not come within operation upon the grain at the corners of the field and therefore to harvest this grain it is necessary to manually cut the grain. It is therefore one of the principal objects of the invention to provide a novel hitch which will guide the implement, upon travel of the tractor in a turning direction, so as to maneuver the implement to a position to start cutting of the grain in a path substantially at right angles to the swath, and to come into contact with the grain at the corners of the grain line. By this arrangement it is obvious that great advantages are attained in the cultivating of row crops.

A further object of the invention is the provision of a hitch of the class described wherein a farming implement will be guided for traction close to a fence enclosing the field and be tractioned at the corners cutting a square swath instead of the usual corner curved swath.

Other objects will appear hereinafter.

The invention consists in the novel arrangement and combination of parts to be hereinafter described and claimed.

The invention will be best understood by references to the accompanying drawings, illustrating the preferred form of construction and in which:

Fig. 1 is a top plan view of the hitch embodied in the invention showing the same connecting a tractor to a farming implement, Fig. 2 is a side elevational view of the illustration in Fig. 1, Fig. 3 is a perspective view of a trackway or guide embodied in the invention, Fig. 4 is a fragmentary sectional view of the invention taken substantially on line 4—4 of Fig. 1, Fig. 5 is a fragmentary sectional view of the invention taken substantially on line 5—5 of Fig. 1, Fig. 6 is a fragmentary sectional view of the invention taken substantially on line 6—6 of Fig. 1, Fig. 7 is a fragmentary sectional view of the invention taken substantially on line 7—7 of Fig. 1, Fig. 8 is a fragmentary sectional view showing the method of connecting the connecting link embodied in the invention to the implement, Fig. 9 is a fragmentary sectional view of the invention taken substantially on line 9—9 of Fig. 1, and Fig. 10 illustrates diagrammatical views, designated A, B, C, and D, of the invention showing various positions of the tractor relative to the farming implement.

Referring particularly to Fig. 1 of the drawings a farming implement is indicated generally at 15 and includes a frame 16 mounted upon wheels 17 and 18. This implement may be one of the many harvesting implements used in farming for the purpose of cultivating and harvesting a field.

In Fig. 1 I also illustrate for the purpose of fully understanding the invention, a tractor 19 which includes a body 20 supported at its rear end by tractor wheels 21 and its forward end by steering wheels 22 controlled by the usual steering mechanism generally indicated at 23. This tractor can be of any approved type now in use by farmers for providing traction to farming implements.

The tractor 19 is provided at its rear end with a fixed tongue 24 to which is riveted or otherwise fixed thereto an extension tongue 24' carrying a fixed connecting plate 25 fixed centrally thereto by means of bolts 26, or the like.

Forwardly of the wheel 17 is a connecting plate 27 having reduced end portions 28 bearing in supporting arms 29 fixed to the frame as at 30. The reduced end portions 28 serve to permit free rotation of the connecting plate and for compensating for vertical movement of the frame to reduce the strain at the bearing points thereof.

To the connecting plate 27, at one end thereof, is connected a draw bar 31 by means of a removable pivot pin 32 insertable through the connecting plate and end plates 33 fixed to the draw bar as at 34. The draw bar 31 extends forwardly of the implement toward the tractor 19 and is pivotally connected to the connecting plate 25 by means of a removable pivot pin 35 insertable through the end of the draw bar and connecting plate and a bracket 35'.

In order to support the forward end of the implement in the position illustrated in Fig. 1 there is provided a supporting rod 36 having universal joint connections, indicated at 37, to the frame 16 and draw bar 31, provision of the universal joint connections being to permit movement of the draw bar relative to the frame when traction is induced to the implement through the medium of the tractor.

As aforesaid mentioned it is an object of the invention to induce movement to the implement to cause the same to traction a square corner at the end of a swath when guided to start a new path substantially at right angles with respect thereto and this is accomplished through the medium of a combination of elements which will now be described.

At a predetermined point on the draw bar I mount by suitable means a guide plate 38 having a circular shaped yoke portion 39 providing a trackway 40 for a roller member 41 mounted for rotation on a pivot arm 42. This pivot arm 42 is pivotally connected to guide plate 38 centrally thereof as at 39'. To the pivot arm 42 is connected, as at 43, a connecting link 44 having its opposite end pivotally connected to the frame 16 by means of a bracket 16' located at a point to the left of the wheel 17. The connecting link 44 crosses the draw bar 31 at an angle and serves to compel traction of the frame with the cooperation of a connecting rod 45. This rod 45 is pivoted at one end to the end 46 of the plate 25, and has its opposite end slidably supported by a bracket 47 carried by the pivot arm 42 at the under side thereof. This bracket 47 is provided with depending spaced angled ends 48 slidably supporting the connecting rod 45 as above mentioned, and interposed between the angled ends and a collar 49 of the connecting rod is a spring member 50. The end of the connecting rod carrying this spring member 50 is threaded to receive a suitable nut 51 whereby the connecting rod can be adjusted relatively to its slidable support. The spring member is adapted to serve as a shock absorber relieving the strain on the bracket when the connecting rod is operated to induce turning movement to the tractor through cooperation with the connecting link 44. This spring member further serves to permit movement of the connecting rod 45 before movement is imparted to the pivot arm 42 thereby eliminating sudden jerks between the operating parts of the turning mechanism.

Having described the preferred form of construction of my invention I will now proceed to give a brief description of the operation of the same in such language as will be best understood by those skilled in the art.

To fully understand the operation of the invention, reference is to be made to Fig. 10 of the drawings illustrating various positions of the tractor relative to the implement.

In the operation of the tractor, the same is connected to the implement through the medium of the draw bar 31, carrying the pivot arm 42 connected in the manner herein stated to connecting members 44 and 45 which are in turn connected to the implement and tractor respectively.

As is noted from observation of the drawing, the tractor is located forwardly on the right hand side of the implement for the purpose of keeping the tractor from moving over the grain. For the purpose of describing the various movements of the tractor and implement assume that the tractor is drawing the implement over a field in substantially a straight path and that the end of the grain field has now been reached and it is the desire of the operator to maneuver the tractor so as to compel the implement to turn a square corner. To do this the operator guides the tractor in a circular direction away from the straight path travelled and as the tractor takes this course the implement will be turned to pivot rearwardly of the tractor on the wheel 17 having a position relative to the tractor as illustrated in the diagrammatical view A of Fig. 10. The operator of the tractor having guided the tractor a sufficient distance off of its course, steers the tractor around to return to assume a position at an angle relatively to the implement, it being pointed out that as the tractor moves to this position the implement will pivot on its opposite wheel 18 assuming the position relative to the tractor as illustrated in the diagrammatical view B of the drawing. The operator of the tractor now steers the tractor so as to cause the same to turn in toward the implement and assume a position on a straight line with the edge of the grain and in assuming this position the implement revolves in a circular direction on both of its wheels having an imaginary pivot point approximately in the center of the frame. It will be noted that the implement in assuming this position does not have a tendency to move forward or change its position other than turning in a circular direction on its imaginary pivot point, to assume the position above mentioned as best illustrated in the diagrammatical view C of Fig. 10. The tractor continues its course, the driver steering the tractor to bring the inside wheels close to the grain line and as the tractor continues a straight course of travel the implement begins to pivot on its wheel 18 to assume a position in alignment with the swath line of the grain as illustrated in the diagrammatical view D of Fig. 10. The tractor and implement in this position are now ready to proceed in a forward straight path until the next corner is reached at which time the operation briefly described above is repeated.

It is apparent that the novel hitch embodied in the invention compels turning traction of the implement in an opposite direction to turning direction of the tractor and in doing so the implement while being tractored around a grain field cuts each corner at a straight angle rather than on a curved angle as is the case with hitches of which I am familiar with prior to my invention.

It is to be understood that my novel hitch can be provided as a connection between a tractor and any wheel-carried farming implement without destroying the utility of the same.

While I have shown and described the preferred form of my invention it is to be understood that various changes and alterations may be carried out during manufacture without departing from the spirit of the invention or the scope of the appended claims.

The invention having been set forth, what I claim as new and useful is:

1. In a hitch of the class described, the combination with a farming implement and a tractor, of a draw bar providing a connection between the implement and the tractor, means for compelling turning traction of the implement in an opposite direction to the turning traction of the tractor, said means including a member pivotally supported by the draw bar, a connection between the member and the implement, a connecting member having one end portion pivotally connected to the tractor, and a yieldable connection between the pivotally mounted member and the opposite end portion of the connecting member.

2. In a hitch of the class described including a draw bar, a guide member carried by the draw bar and defining a track way, a connecting link having an end portion connected to the frame of a farming implement, a connecting rod having an end portion connected to a tractor, and an arm having one end portion pivotally connected to the guiding member and having an opposite end portion working over the track way, the opposite end portion of the connecting link being connected to the arm, and a yieldable connection between the arm and the opposite end portion of the connecting rod.

3. In a hitch of the class described including a connecting plate, a draw bar having an end portion pivotally connected to an end portion of the connecting plate and having an opposite end portion pivotally connected to a farming implement, an arm pivotally supported by the draw bar and movable through an arc of a circle, a connecting rod having an end portion connected to the opposite end portion of the connecting plate, a connecting link having an end portion connected to the farming implement and an opposite end portion connected to the arm, and a yieldable connection between the arm and the opposite end portion of the connecting rod.

4. In a hitch of the class described including a connecting plate, a draw bar having an end portion pivotally connected to an end portion of the connecting plate and having an opposite end portion pivotally connected to a farming implement, an arm pivotally supported by the draw bar and movable through an arc of a circle, a connecting rod having an end portion connected to the opposite end portion of the connecting plate, a connecting link having an end portion connected to the farming implement and an opposite end portion connected to the arm, a yieldable connection between the arm and the opposite end portion of the connecting rod, and means providing a guide for the end portion of the arm opposite the pivotal connection thereof during movement of the arm through the arc of a circle.

5. In a hitch of the class described including a support, a member mounted for pivotal movement on the support, a bracket movable with the member, a connecting member slidably supported by the bracket and having a shoulder thereon, a resilient member disposed between the shoulder and a portion of the bracket, and a connecting link operatively connected to the movable member.

6. In a hitch of the class described including a draw bar, a support on the draw bar having a portion providing a track-way, a member operatively mounted on the support and having an end movable in the track-way, a bracket on the pivotally mounted member, a connecting rod carried for slidable movement by the bracket, a resilient member retarding slidable movement of the connecting rod, and a connecting link pivotally connected to the pivotally mounted member.

7. In a hitch of the class described including a draw bar, a support on the draw bar having a portion providing a track-way, a member operatively mounted on the support and having an end movable in the track-way, a bracket on the pivotally mounted member, a connecting rod carried for slidable movement by the bracket, a resilient member retarding slidable movement of the connecting rod, a connecting link pivotally connected to the pivotally mounted member, and a member providing a pivotal connection with the connecting rod and draw bar.

In testimony whereof I affix my signature.

JOHN T. RITENOUR.